(12) United States Patent
Frommelt et al.

(10) Patent No.: US 10,728,387 B1
(45) Date of Patent: Jul. 28, 2020

(54) SHARING ON-SCENE CAMERA INTELLIGENCE

(71) Applicant: MOTOROLA SOLUTIONS, INC., Chicago, IL (US)

(72) Inventors: Brian J. Frommelt, Deer Park, IL (US); James C. Duran, Palatine, IL (US); Larry D. Freeman, Valparaiso, FL (US); Francesca Schuler, Palatine, IL (US); Ross Venhuizen, Chicago, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 16/549,438

(22) Filed: Aug. 23, 2019

(51) Int. Cl.
*H04M 3/51* (2006.01)
*H04N 7/18* (2006.01)

(52) U.S. Cl.
CPC ....... *H04M 3/5116* (2013.01); *H04M 3/5183* (2013.01); *H04N 7/181* (2013.01); *H04M 2242/04* (2013.01); *H04M 2242/14* (2013.01); *H04M 2242/30* (2013.01)

(58) Field of Classification Search
USPC ............... 455/404.2; 348/14.02; 379/37–52
See application file for complete search history.

(56) References Cited

U.S. PATENT DOCUMENTS

| | | | |
|---|---|---|---|
| 8,204,473 B2 | 6/2012 | Mathis et al. | |
| 9,112,996 B2 | 8/2015 | Klaban | |
| 9,137,383 B2 | 9/2015 | Estrada et al. | |
| 9,226,124 B2 | 12/2015 | Schuler et al. | |
| 9,389,083 B1 | 7/2016 | Agulnik et al. | |
| 10,051,413 B2 | 8/2018 | Faraone et al. | |
| 10,187,754 B1* | 1/2019 | Hansen | H04L 9/3236 |
| 2002/0106059 A1 | 8/2002 | Kroll et al. | |
| 2008/0273670 A1 | 11/2008 | Dickinson | |
| 2010/0231714 A1 | 9/2010 | Flores et al. | |
| 2012/0329420 A1* | 12/2012 | Zotti | H04M 1/72541 455/404.2 |
| 2013/0005294 A1* | 1/2013 | Levinson | H04N 7/18 455/404.2 |
| 2013/0052983 A1 | 2/2013 | Fletcher et al. | |

(Continued)

*Primary Examiner* — Maria El-Zoobi
(74) *Attorney, Agent, or Firm* — Michael Best & Friedrich LLP

(57) ABSTRACT

Systems and methods for sharing on-scene camera intelligence, available at crime center computing devices, with call handling and CAD computing devices. One example call handling computing device includes an electronic processor configured to receive a call from a remote caller and caller location information. The electronic processor is further configured to transmit, to a crime center computing device, a camera availability request including the caller location information. The electronic processor is also configured to receive, from the crime center computing device, an indication of available cameras substantially at the location of the remote caller and status information for the available cameras. The electronic processor is further configured to provide a call handling user with the status information. The electronic processor is also configured to receive, from the crime center computing device, at least one of video intelligence derived from the available cameras or video feeds from the available cameras.

18 Claims, 6 Drawing Sheets

(56) References Cited

U.S. PATENT DOCUMENTS

| | | | |
|---|---|---|---|
| 2014/0078300 A1 | 3/2014 | Tine et al. | |
| 2014/0368601 A1* | 12/2014 | deCharms | H04W 4/021 348/14.02 |
| 2017/0251347 A1* | 8/2017 | Mehta | H04M 3/5116 |
| 2018/0324300 A1* | 11/2018 | Banaudha | H04W 4/90 |
| 2019/0378400 A1* | 12/2019 | Lisaj | A63F 13/216 |

* cited by examiner

SHARING ON-SCENE CAMERA INTELLIGENCE

BACKGROUND OF THE INVENTION

Today, public safety answering points (PSAPs) that contain emergency call handling and computer aided dispatch (CAD) incident management are typically in separate locations from crime center operations. Further, emergency call handling and CAD incident management may not be co-located within the PSAP. For roles that are not co-located (i.e., call handlers, dispatchers, and intelligence analysts), it is difficult to interact between the roles of managing calls, managing incident responses, and managing crime center operations. In addition, depending of the volume of calls, even if the roles are co-located, it is difficult to communicate across different applications.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
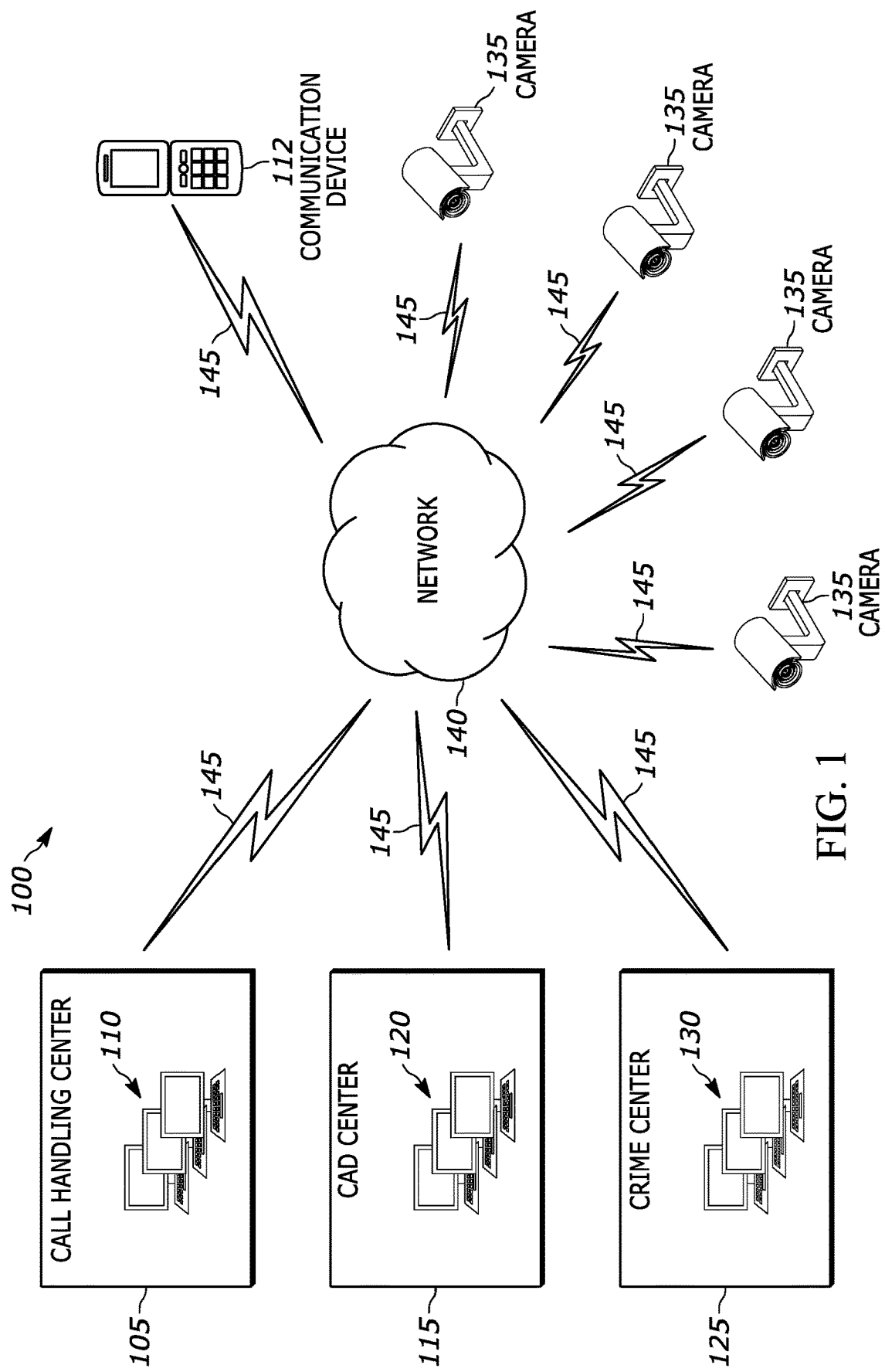
FIG. 1 is a block diagram of a communication system in accordance with some embodiments.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Crime centers (also known as real-time crime centers) typically have access to a plurality of different video feeds from, for example, traffics cameras and security cameras. Crime centers use video intelligence derived video feeds to aid first responders during emergency response. For a call handler at a public safety answering point (PSAP), access to video intelligence or video feeds from cameras at the location of a caller during a call may aid the call handler in making informed decisions of actions to take to provide assistance to the caller. Further, for a dispatcher at the PSAP, access to video intelligence or video feeds from cameras at the location of an incident may aid the dispatcher in making informed decisions of actions to take to handle the incident. However, call handlers and dispatchers do not have access to the video feeds available to crime centers. Further, the call handlers and dispatchers do not know if cameras are available in the vicinities of callers and incidents. Accordingly, embodiments disclosed herein provide, among other things, a system and method for sharing on-scene intelligence available at crime centers.

One embodiment provides a system for sharing on-scene camera intelligence, available at crime center computing devices, with public or enterprise safety call handling computing devices. The public or enterprise safety call handling computing device includes an output interface and a call handling electronic processor. The call handling electronic processor is configured to receive a call from a remote caller and caller location information identifying a location of the remote caller. The call handling electronic processor is also configured to transmit, via an intervening internet protocol (IP) network to a crime center computing device, a camera availability request including the caller location information. The call handling electronic processor is also configured to receive, via the intervening IP network from the crime center computing device, an indication of one or more available cameras substantially at the location of the remote caller and status information for the one or more available cameras. The call handling electronic processor is also configured to provide, by the output interface, a call handling user at the public or enterprise safety call handling computing device with the status information for the one or more available cameras. The call handling electronic processor is also configured to receive, via the intervening IP network from the crime center computing device, at least one of video intelligence derived from the one or more available cameras or video feeds from the one or more available cameras.

Another embodiment provides a method for sharing on-scene camera intelligence, available at crime center computing devices, with public or enterprise safety call handling computing devices. The method includes receiving, at a public or enterprise safety call handling computing device, a call from a remote caller and caller location information identifying a location of the remote caller. The method also includes transmitting, by the public or enterprise safety call handling computing device via an intervening IP network to a crime center computing device, a camera availability request including the caller location information. The method also includes receiving, by the public or enterprise safety call handling computing device via the intervening IP network from the crime center computing device, an indication of one or more available cameras substantially at the location of the remote caller and status information for the one or more available cameras. The method also includes providing, by an output interface of the public or enterprise safety call handling computing device, a call handling user at the public or enterprise safety call handling computing device with the status information for the one or more available cameras. The method also includes receiving, by the public or enterprise safety call handling computing device via the intervening IP network from the crime center computing device, at least one of video intelligence derived from the one or more available cameras or video feeds from the one or more available cameras.

FIG. 1 is a block diagram of an example of a communication system 100. FIG. 1 shows one example of a network in which the invention may be implemented. This example is for illustrative purposes only and the invention may be implemented on other networks. In the example shown, the communication system 100 includes a call handling center 105. The call handling center 105 includes a plurality of call handling computing devices 110 each operated by a different call handler. In some embodiments, a call handler is a person who analyzes communications (for example, a voice call, a video call, text messages, and the like) received from a citizen via a call handling computing device 110 (for example, a computer having a screen, voice, video, and text capabilities). The call handler identifies an incident based on the communication, and decides how to respond to the communication to help the citizen and handle the incident. For example, the call handler may transfer the communication to a different agency (for example, animal control), take no action (for example, when the communication is a prank call or an accidental call), or transfer the communication to a dispatcher. In some embodiments, the call handling computing devices 110 are operated by 911 call handlers that receive communications from citizens who enter 9-1-1 on their communication devices. For example, a call handling computing device 110 may receive a call from a communication device 112 of a remote caller who entered 9-1-1 on the communication device 112.

The communication system 100 also includes a computer aided dispatch (CAD) center 115. The CAD center 115 includes a plurality of CAD computing devices 120 each operated by a different dispatcher. In some situations, a CAD computing device 120 of a dispatcher receives communications from citizens in response to call handlers using call handling computing devices 110 to transfer the communications to the CAD computing device 120. In some situations, the dispatcher is temporarily assigned to an incident in which officers are supervising, maintaining, providing assistance, and the like (for example, a concert, a sporting event, management of a theme park or other entertainment venue, and the like). In some embodiments, the incident is an event, occurrence, or situation in which officers are involved. In some embodiments, the incident is a public safety incident in which public safety officers are called to a location to provide assistance in resolving or preventing a societal or environmental problem (for example, a location where a suspect is committing or has committed a crime, a fire, a vehicular accident, a traffic stop, and the like).

In some embodiments, the call handling center 105 and the CAD center 115 may be co-located, for example, in a security management office at a theme park or a public safety command center such as a police headquarters, fire station, dispatch center, public safety answering point (PSAP), operations center, command and control facility, and the like.

The communication system 100 also includes a crime center 125. The crime center 125 (an example of a "real-time crime center") includes a plurality of crime center computing devices 130 each operated by a different intelligence analyst. The plurality of crime center computing devices 130 are configured to receive video feeds from a plurality of cameras 135. In some embodiments, the plurality of cameras 135 includes security cameras, traffic cameras, police observation device (POD) cameras, body-worn cameras of officers (or security personnel), dash cameras of police vehicles (or security vehicles), or a combination thereof. Alternative or in addition, the plurality of cameras 135 includes cameras that are included in network-connectable communication devices of civilians such as smart phones and tablets.

As indicated in FIG. 1, the devices illustrated in FIG. 1 may communicate with each other over a network 140 over respective wireless links 145 and via corresponding network interfaces including one or more transceiver circuits (for example, by sending and receiving radio signals). Although depicted in FIG. 1 as communicating with each other over the network 140 over respective wireless links 145, one or more of the illustrated components may communicate with each other over the network 140 over one or more wired links (not shown). For example, one or more of the cameras 135 may communicate with one or more of the crime center computing devices 130 over the network 140 over one or more wired links. The network 140 (which may be an example of an "intervening internet protocol (IP) network") may include wireless and wired portions. In some embodiments, all or portions of the network 140 operate according to an industry standard land mobile radio (LMR) or cellular protocol such as, for example, the Project 25 (P25) standard defined by the Association of Public Safety Communications Officials International (APCO), the TETRA standard defined by the European Telecommunication Standards Institute (ETSI), the Digital Private Mobile Radio (dPMR) standard also defined by the ETSI, the Digital Mobile Radio (DMR) standard also defined by the ETSI, the Long Term Evolution (LTE) (including LTE-Advanced or LTE-Advanced Pro compliant with, for example, the 3GPP TS 36 specification series), or the 5G (including a network architecture compliant with, for example, the 3GPP TS 23 specification series and a new radio (NR) air interface compliant with the 3GPP TS 38 specification series) standard, among other possibilities, and over which multimedia broadcast multicast services (MBMS), single site point-to-multipoint (SC-PTM) services, or Mission Critical Push-to-talk (MCPTT) services may be provided, or over which an open mobile alliance (OMA) push to talk (PTT) over cellular (OMA-PoC), a voice over IP (VoIP), or a PTT over IP (PoIP) application may be implemented. In some embodiments, the network 140 includes the Internet, a Bluetooth™ network, a wireless local area network (for example, Wi-Fi), a wireless accessory Personal Area Network (PAN), a Machine-to-machine (M2M) autonomous network, a public switched telephone network, or a combination thereof.

Figure 2:
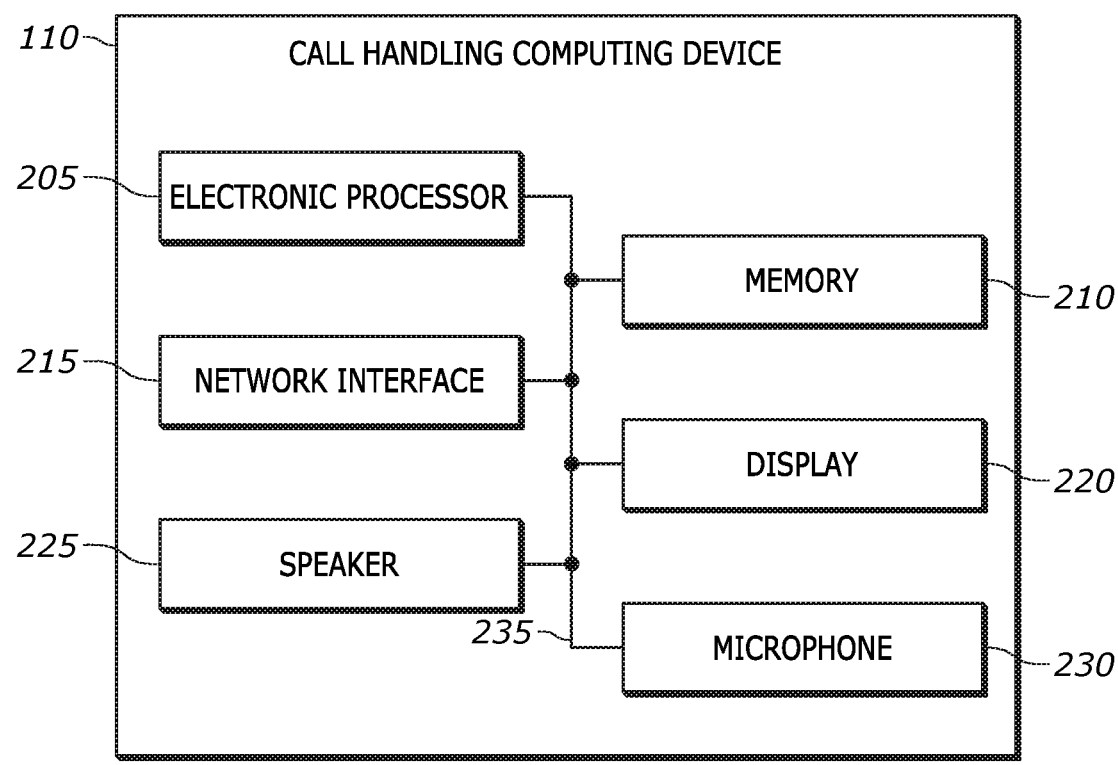
FIG. 2 is a block diagram of an example of an embodiment of a call handling computing device included in the communication system of FIG. 1.

FIG. 2 is a block diagram of one example of an embodiment of the call handling computing device 110. The call handling computing device 110 illustrated in FIG. 2 includes an electronic processor 205 (for example, a microprocessor or other electronic device), memory 210, a network interface 215, a display 220, a speaker 225, and a microphone 230. The electronic processor 205 (an example of a "call handling electronic processor"), the memory 210, the network interface 215, and the other components of the call handling computing device 110 are communicably coupled to each other via a bus 235. In some embodiments, the call handling computing device 110 includes fewer or additional components in configurations different from that illustrated in FIG. 2. For example, the call handling computing device 110 may additionally include a push-to-talk button or a camera. As another example, the call handling computing device 110 may include one or more additional input devices such as a computer mouse and a keyboard that receive inputs from a user of the call handling computing device 110.

The memory 210 may include read only memory (ROM), random access memory (RAM), other non-transitory computer-readable media, or a combination thereof. The electronic processor 205 is configured to receive instructions and data from the memory 210 and execute, among other things, the instructions. In particular, the electronic processor 205 executes instructions stored in the memory 210 to perform the methods described herein.

The network interface 215 sends and receives data to and from the network 140. In some embodiments, the network interface 215 includes one or more transceivers for wirelessly communicating with the network 140. Alternatively or in addition, the network interface 215 may include a connector or port for receiving a wired connection to the network 140, such as an Ethernet cable. The electronic processor 205 may receive one or more data feeds (for example, video feeds) over the network 140 through the network interface 215 (for example, data feeds generated by one or more of the cameras 135 and transmitted over the network 140). In some embodiments, communication of data feeds may occur in approximately real-time. The electronic processor 205 may communicate data generated by the call handling computing device 110 over the network 140 through the network interface 215. For example, the electronic processor 205 receives electrical signals representing sound from the microphone 230 and may communicate information relating to the electrical signals over the network 140 through the network interface 215 to other devices. Similarly, the electronic processor 205 may output the one or more data feeds received from the network 140 through the network interface 215 through the display 220, the speaker 225, or both. For example, the call handling computing device 110 engages in a voice call with the communication device 112 of the remote caller over the network 140.

In some embodiments, the display 220 displays images, video (e.g., video feeds from the cameras 135), text, data from sensor input, or a combination thereof. The display 220 may be, for example, a liquid crystal display (LCD) screen or an organic light emitting display (OLED) display screen. In some embodiments, a touch-sensitive input interface may be incorporated into the display 220 as well, allowing the user to interact with content provided on the display 220. The speaker 225 converts electrical signal into audible sound. In some embodiments, one or both of the display 220 and the speaker 225 are referred to as an "output interface" of the call handling computing device 110 that present data feeds to a user (for example, a call handling user). The microphone 230 converts acoustic waves into electrical signals. In some embodiments, one or more of the microphone 230, a computer mouse, a keyboard, and a touch-sensitive input interface of the display 220 are referred to as an "input interface" of the call handling computing device 110 that receive input from the user.

In some embodiments, each of the CAD computing devices 120 and the crime center computing devices 130 include similar components as the call handling computing device 110 illustrated in FIG. 2 and described herein. For example, the CAD computing device may include an electronic processor (an example of a "CAD electronic processor"), memory, a display, etc. In alternate embodiments, one or both of the CAD computing devices 120 and the crime center computing devices 130 includes fewer or additional components in configurations different from that illustrated in FIG. 2.

Figure 3:
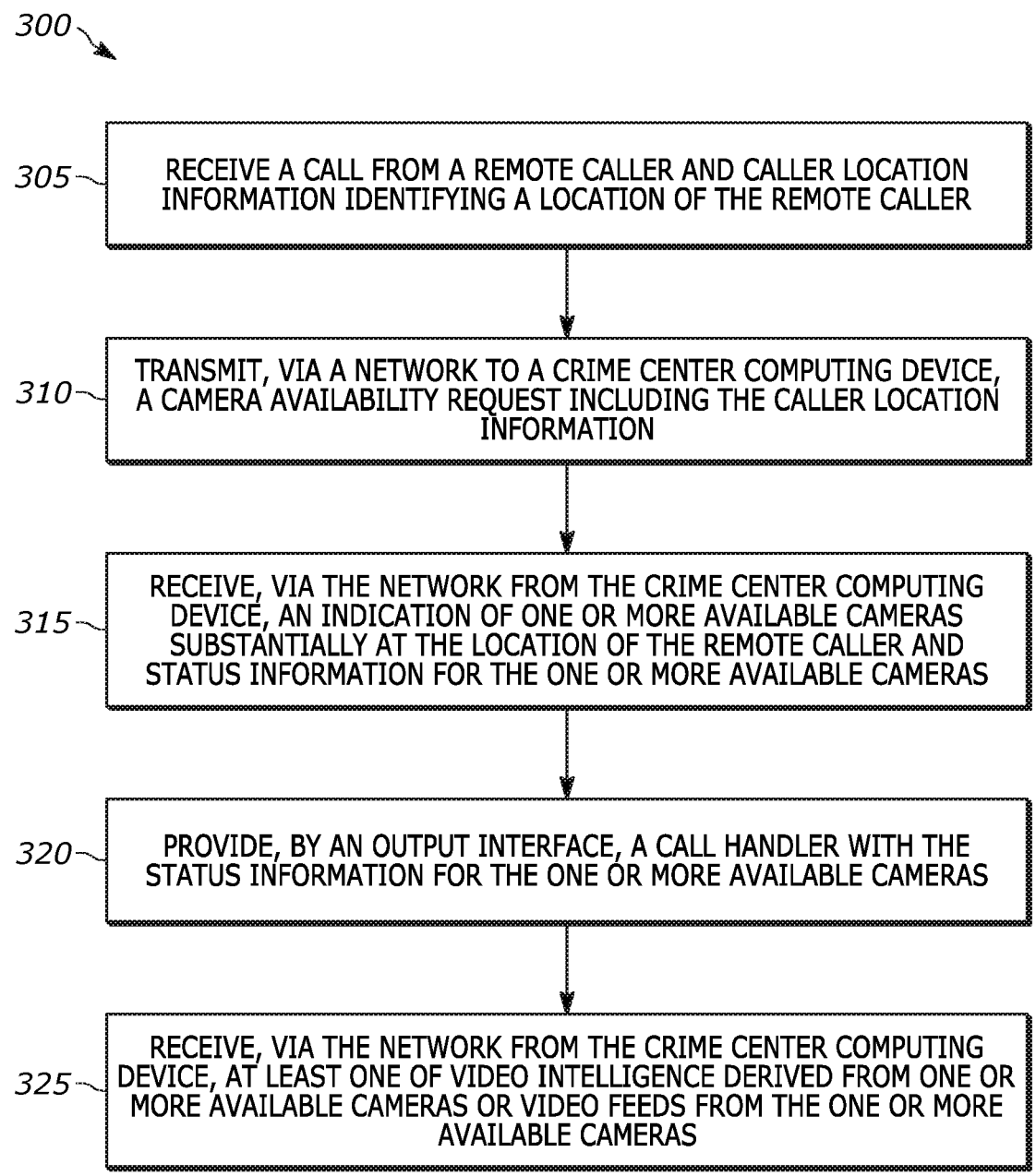
FIG. 3 is a flowchart of a method for sharing on-scene camera intelligence, available at a crime center computing device, with a call handling computing device, in accordance with some embodiments.

As described above, call handlers at the call handling computing devices 110 do not have access to video feeds available to crime center computing devices 130. Further, when handling calls, call handlers do not know if cameras are available in the vicinity of the remote callers. FIG. 3 illustrates a flowchart of an example of a method 300 performed by the call handling computing device 110 for sharing on-scene camera intelligence, available at the crime center computing device 130, with the call handling computing device 110.

At block 305, the call handling computing device 110 (an example of a "public or enterprise safety call handling computing device") receives a call from a remote caller and caller location information identifying a location of the remote caller. For example, the call handling computing device 110 receives a call from the communication device 112 of the remote caller illustrated in FIG. 1. In some embodiments, the call is from a mobile device operated by a citizen (for example, a smart phone of a citizen who has entered user input to transmit one or more data feeds to the call handling center 105 by, for example, dialing 9-1-1). In some embodiments, the caller location information includes global positioned system (GPS) coordinates of the communication device 112 used by the remote caller to make the call. For example, the call handling computing device 110 may receive data from the communication device 112 of the remote caller indicating GPS coordinates of the communication device 112. Alternatively or in addition, the caller location information includes a street address located near the location of the remote caller. For example, the call handling computing device 110 may access a map database to identify a street address located near GPS coordinates received from the communication device 112 of the remote caller. As a further example, the remote caller may provide a nearby street address to a call handler at the call handling computing device 110 and the call handler provides the nearby street address to the call handling computing device 110 via an input interface. Alternatively or in addition, the caller location information includes a street address associated with the phone number of the communication device 112 used by the remote caller to make the call. For example, the call handling computing device 110 may access a reverse look-up database to identify a street address associated with the phone number of the communication device 112 used by the remote caller to make the call. In some embodiments, the call handling computing device 110 receives the caller location information along with (or included as part of) the call from the remote caller. In alternate embodiments, the call handling computing device 110 determines the caller location information based at least in part on information received along with (or included as part of) the call from the remote caller. For example, the call handling computing device 110 may receive a phone number of the communication device 112 used by remote caller to make the call and use the phone number to identify a street address associated with the phone number.

At block 310, the call handling computing device 110 transmits a camera availability request including the caller location information to the crime center computing device 130 (an example of a "public or enterprise safety crime center computing device") via the network 140 (an example of an "intervening internet protocol (IP) network"). By including the caller location information in the camera availability request, the crime center computing device 130 is able to identify one or more available cameras substantially at the location of the remote caller.

At block 315, the call handling computing device 110 receives, from the crime center computing device 130 via the network 140, an indication of one or more available cameras substantially at the location of the remote caller and status information for the one or more available cameras. In some embodiments, the status information includes the quantity of the one or more available cameras. For example, the status information may indicate that two cameras are available at or around the location of the remote caller. Alternatively or in addition, the status information includes the locations of the one or more available cameras at or around the location of the remote caller. For example, the status information may include GPS coordinates, street addresses, location descriptions (e.g., camera is mounted near the front entrance of the building), or a combination thereof. Alternatively or in addition, the status information includes the types of the one or more available cameras. For example, the status information may indicate whether the one or more available cameras include fixed cameras, pan-tilt-zoom cameras, or both. Alternatively or in addition, the status information includes provisioning information for the one or more available cameras. Alternatively or in addition, the status information includes an eyes on caller location notification indicating that an intelligence analyst at the crime center computing device 130 (an example of a "crime center user") is watching the video feeds from the one or more available cameras. The one or more available cameras may include, for example, all or any combination of the cameras 135 included in the communication system 100 illustrated in FIG. 1.

At block 320, the call handling computing device 110 provides, via an output interface of the call handling computing device 110, a call handler at the call handling computing device 110 (an example of a "call handling user") with the status information for the one or more available cameras. In some embodiments, the call handling computing device 110 provides a visual indication of the one or more available cameras via the display 220. For example, the call handling computing device 110 may display text on the display 220 indicating the quantity of available cameras, the locations of available cameras, the distances between each available camera and the remote caller, other status information, or a combination thereof As a further example, the call handling computing device 110 may display a predetermined icon on the display 220 indicating to the call handler that cameras located around the remote caller are available. As an additional example, if the available cameras are pre-provisioned, the call handling computing device 110 may display a map on the display 220 which indicates where the available cameras are located and the field-of-views of the available cameras. Alternatively or in addition, the call handling computing device 110 provides an audible indication of the one or more available cameras via the output interface. For example, the call handling computing device 110 may generate a chime sound with the speaker 225 indicating to the call handler that cameras are available at or around the location of the remote caller. As a further example, the call handling computing device 110 may generate an audible message with the speaker 225 indicating to the call handler that cameras are available at or around the location of the remote caller.

At block 325, the call handling computing device 110 receives, via the network 140 from the crime center computing device 130 at least one of video intelligence derived from the one or more available cameras or video feeds from the one or more available cameras. In some embodiments, the video intelligence derived from the one or more available cameras includes audio data and/or text messages describing what an intelligence analyst at the crime center computing device 130 sees via the video feeds from the one or more available cameras. For example, the video intelligence may include a text message indicating the presence of a fire near the remote caller. As a further example, the video intelligence may include an audio message indicating that an armed person is approaching the location of the remote caller. In some embodiments, in addition to, or instead of, receiving video intelligence, the call handling computing device 110 receives, from the crime center computing device 130, video feeds from the one or more available cameras. For example, if the one or more available cameras are properly provisioned and the call handler is authorized, the crime center computing device 130 shares the video feeds from the one or more available cameras. As used herein, the term "video feed" includes a stream of image data captured by a camera, a stream of audio data captured by a camera, or a combined stream of image data and audio data captured by a camera.

In some embodiments, the remote caller is highlighted in the video feeds which the call handling computing device 110 receives from the crime center computing device 130. For example, the crime center computing device 130 may alter a video feed to include a visual indicator that highlights the position of the remote caller in the video feed. In such embodiments, the call handling computing device 110 transmits a description of the remote caller to the crime center computing device 130 so that the intelligence analyst at the crime center computing device 130 can locate the remote caller in the video feeds.

In some embodiments, the crime center computing device 130 allocates the one or more available cameras to aid the call handler in handling the call upon identifying the one or more available cameras after the call handling computing device 110 transmits the camera availability request at block 310. In alternate embodiments, the crime center computing device 130 allocates the one or more available cameras to aid the call handler in handling the call responsive to receiving a request from the call handling computing device 110. In some embodiments, after providing the status information for the one or more available cameras to the call handler at block 320, the call handling computing device 110 provides an ability to request, via the input interface, that the one or more available cameras be allocated to aid the call handler in handling the call. For example, the call handler may input a camera allocation request by touching a virtual request button displayed on the display 220. As a further example, a call handler may input a camera allocation request by maneuvering a virtual cursor with a mouse to select a virtual request button displayed on the display 220. As an addition example, a call handler may input a camera allocation request by speaking a predetermined phrase into the microphone 230. As a further example, a call handler may input a camera allocation request by entering a predetermined combination of keys on a keyboard. Upon receiving a request to allocate to one or more available cameras to aid the call handler in handling the call, the call handling computing device 110 transmits the request to allocate the one or more available cameras to aid the call handler in handling the call to the crime center computing device 130 via the network 140.

In some situations, the call from the remote caller received by the call handling computing device 110 may be related to a separate call from another remote caller that is received by another call handling computing device 110. For example, different remote callers may be calling to report the same incident or related incidents. In such situations, a call handler may be unaware that another call handler is talking to another remote caller about the same incident or a related incident. One method of identifying related calls is by identifying call handlers who request allocation of the same cameras or nearby cameras. Thus, in some embodiments, the call handling computing device 110 receives, via the network 140 from the crime center computing device 130, a notification identifying another call handler that recently requested at least one of the one or more available cameras or another nearby camera. By receiving this notification the call handler may contact the other call handler to coordinate their response efforts.

After a call has ended or has been transitioned to a dispatcher, the call handler at the call handling computing device 110 may no longer need to receive the video intelligence and/or video feeds from the crime center computing device 130. Thus, in some embodiments, the call handling computing device 110 transmits, via the network 140, call status updates to the crime center computing device 130. For example, for a call ending, the call handling computing device 110 may transmit, via the network 140, a call status update to the crime center computing device 130 requesting the removal of focus from the one or more available cameras substantially at the location of the remote caller.

Figure 4A:
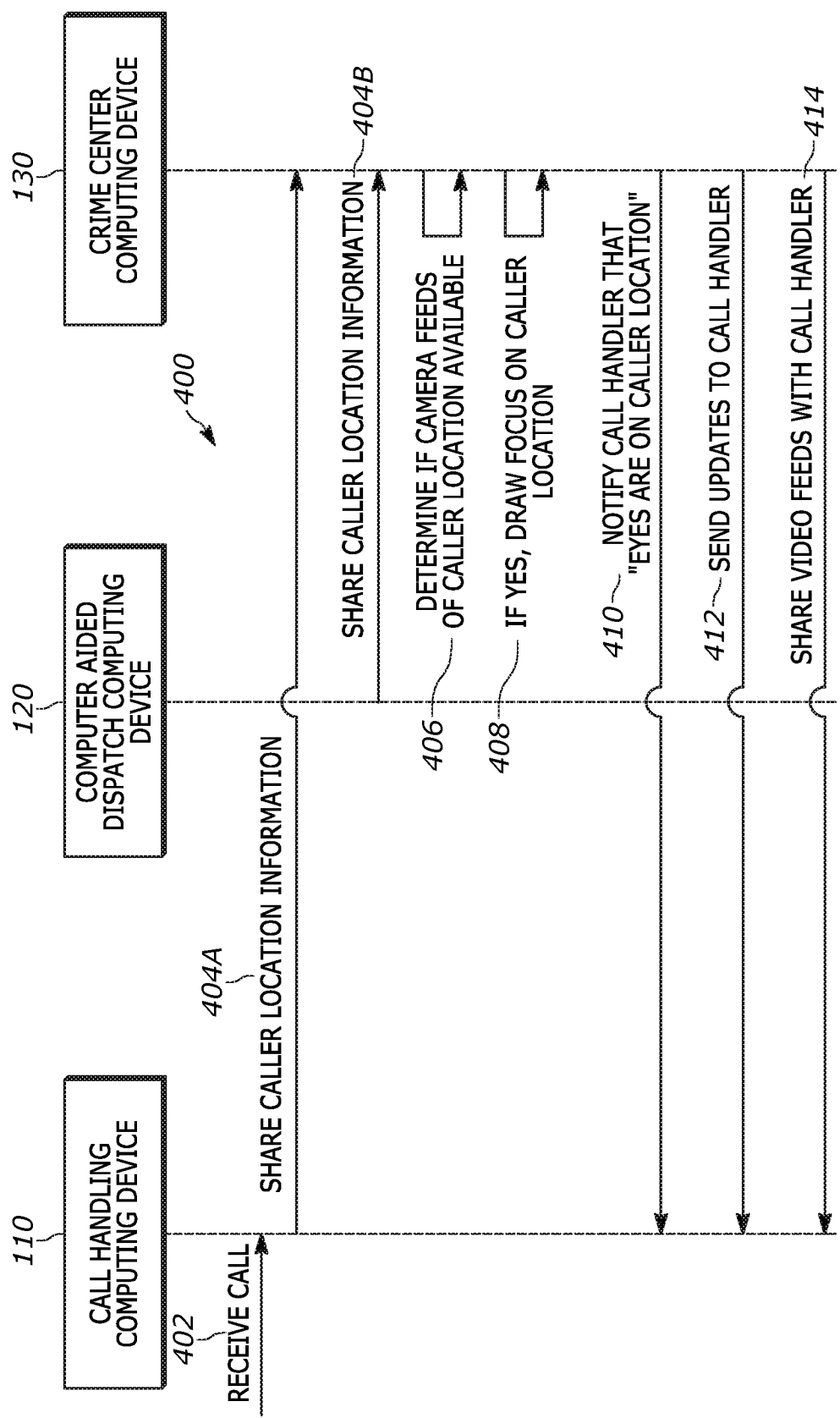
FIG. 4A is a sequence diagram of a portion of a method for sharing on-scene camera intelligence, available at a crime center computing device, with a call handling computing device and a computer aided dispatch computing device, in accordance with some embodiments.
Figure 4B:
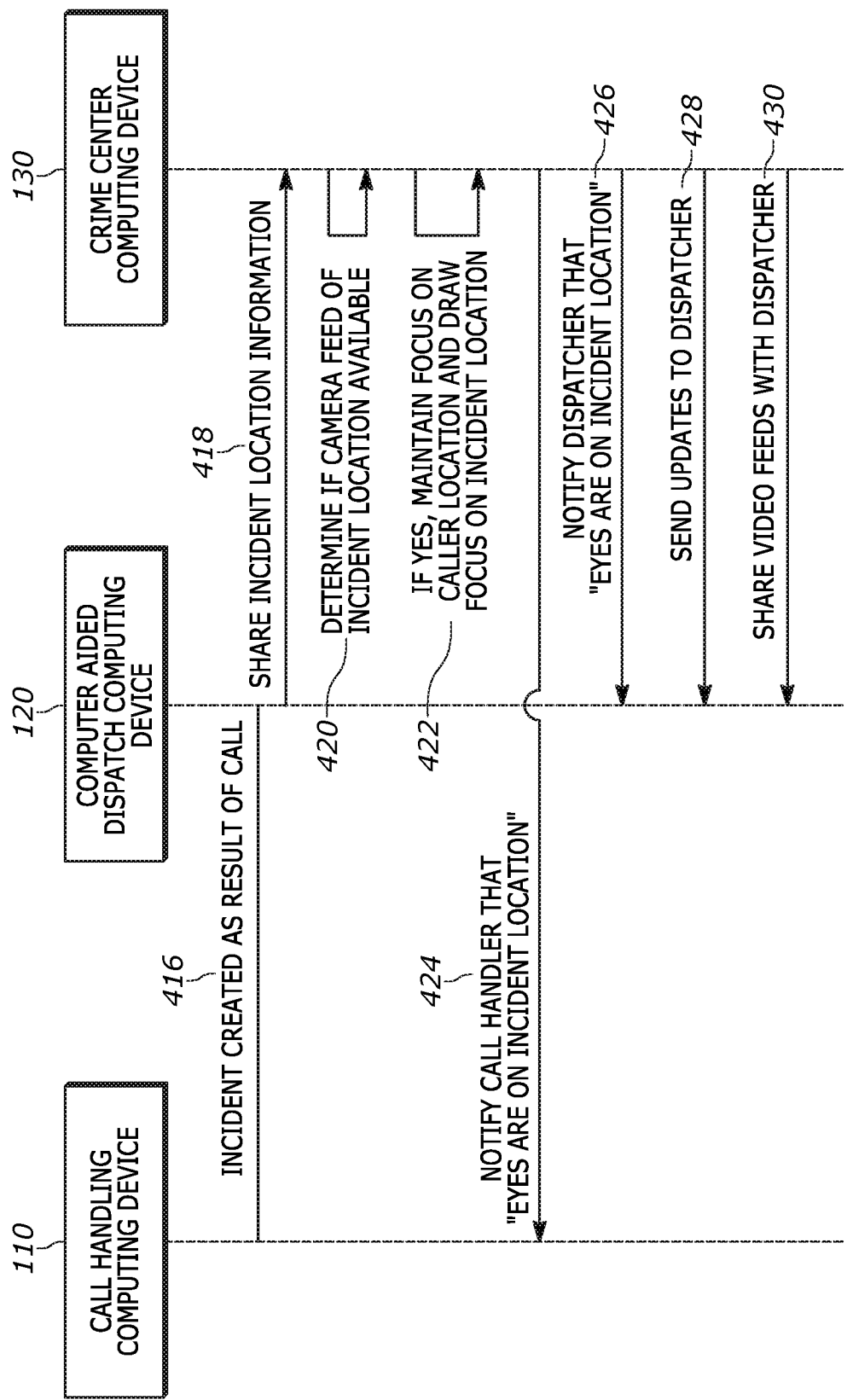
FIG. 4B is a sequence diagram of another portion of the method for sharing on-scene camera intelligence included in FIG. 4A.
Figure 4C:
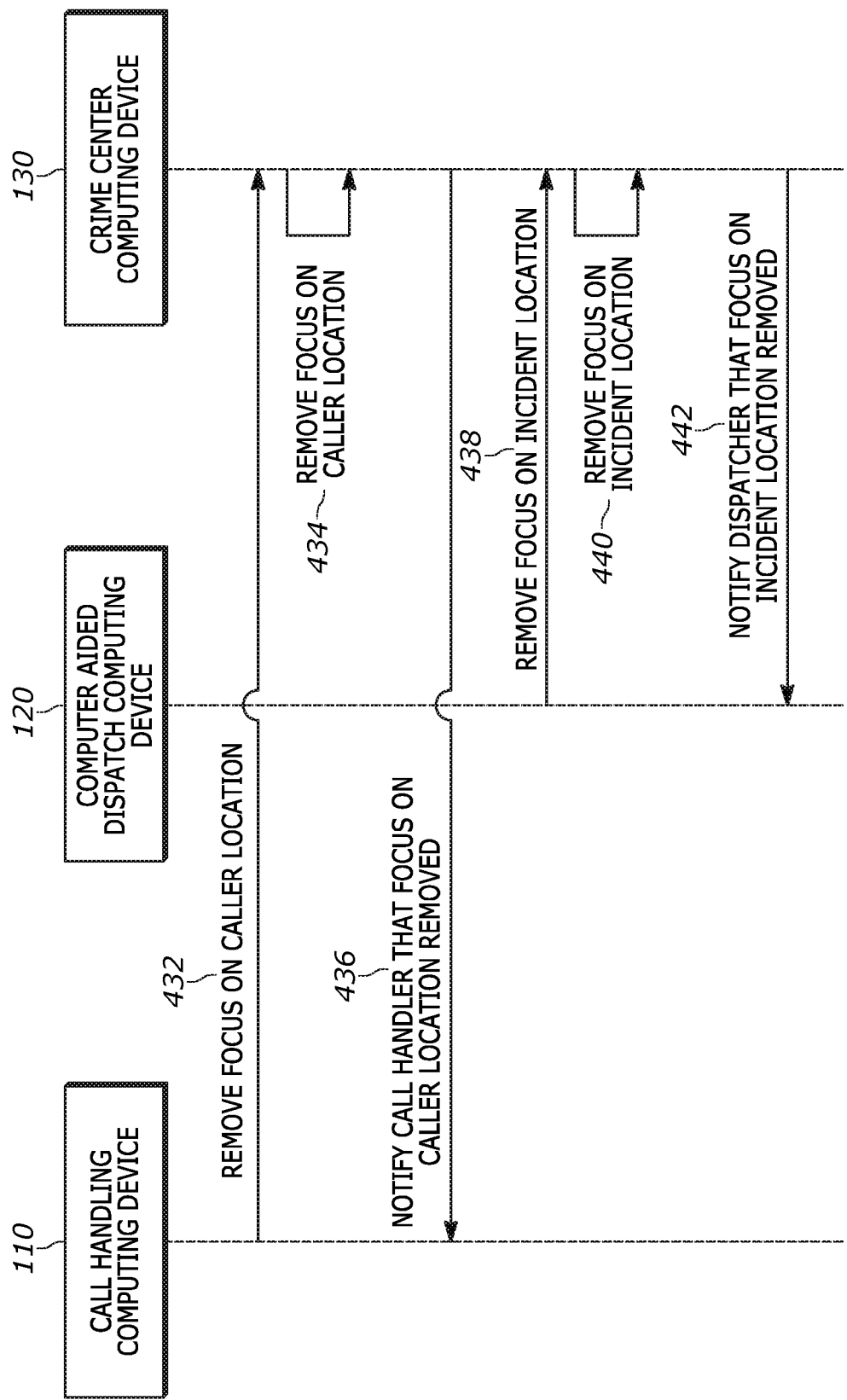
FIG. 4C is a sequence diagram of another portion of the method for sharing on-scene camera intelligence included in FIGS. 4A and 4B.

In some situations, an incident being handling by a dispatcher at a CAD computing device 120 is associated with the call from the remote caller. For example, a new incident may be created as a result of the call transitioning from the call handler at the call handling computing device 110 to a dispatcher at a CAD computing device 120. As a further example, the call handler may recognize that a call is related to an existing incident and send a notification via the call handling computing device 110 to inform the dispatcher handling the existing incident. The existing incident may have been created, for example, by the call handler, the dispatcher handling the existing incident, or a different dispatcher. However, similar to call handlers, dispatchers at CAD computing devices 120 do not have access to the video feeds available to crime center computing devices 130. FIGS. 4A, 4B, and 4C illustrate an example method 400 of sharing on-scene camera intelligence, available at a crime center computing device 130, with both a call handling computing device 110 and a CAD computing device 120.

The method 400 described below includes portions of the method 300 described above, and further illustrates how the different components of the communication system 100 interact with each other to share on-scene camera intelligence. While a particular order of processing steps, message receptions, and/or message transmissions is indicated in FIGS. 4A, 4B, and 4C as an example, timing and ordering of such steps, receptions, and transmissions may vary where appropriate without negating the purpose and advantages of the examples set forth in detail throughout the remainder of this disclosure.

At step 402 in FIG. 4A, the call handling computing device 110 receives a call from a remote caller. The call from the remote caller includes, for example, a voice call, a video call, one or more text messages, and the like. In some embodiments, at step 404A, the call handling computing device 110 shares caller location information with the crime center computing device 130. In alternate embodiments, at step 404B, the CAD computing device 120 shares caller location information with the crime center computing device 130 (e.g., initially or as an updated location for the remote caller). At step 406, the crime center computing device 130 determines if camera feeds of the caller location are available. At step 408, if camera feeds of the caller location are available, the crime center computing device 130 instructs an intelligence analyst at the crime center computing device 130 to draw their focus on the caller location in the video feeds of the caller location. At step 410, the crime center computing device 130 sends a message to the call handling computing device 110 to notify the call handler that "EYES ARE ON CALLER LOCATION." At step 412, the crime center computing device 130 sends messages to the call handling computing device 110 with updates for the call handler. The updates may include video intelligence derived from the video feeds of the caller location. For example, the crime center computing device 130 may send messages to the call handling computing device 110 indicating that the remote caller has abandoned a warehouse location, a fight near the location of the remote caller is escalating, or a safe escape route for the remote caller to depart an unsafe area is available. At step 414, the crime center computing device 130 sends the video feeds of the caller location to the call handling computing device 110 for sharing with the call handler. In some embodiments, prior to sharing the video feeds of the caller location with the call handler, the crime center computing device 130 determines if the call handler is authorized to receive the video feeds of the caller location. For example, in some embodiments, the call handling computing device 110 sends an identifier of the call handler to the crime center computing device 130 and the crime center computing device 130 uses the identifier to determine if the call handler is authorized to receive the video feeds of the caller location.

At step 416 in FIG. 4B, an incident is created as a result of the call. At step 418, the CAD computing device 120 shares incident location information with the crime center computing device 130. In some embodiments, the CAD computing device 120 shares additional incident information with the crime center computing device 130 (e.g., the type of incident). At step 420, the crime center computing device 130 determines if camera feeds of the incident location are available. At step 422, if camera feeds of the incident location are available, the crime center computing device 130 instructs the intelligence analyst at the crime center computing device 130 to maintain focus on the caller location in the video feeds of the caller location, and further instructs the intelligence analyst to draw their focus on the incident location in the video feeds of the incident location. At step 424, the crime center computing device 130 sends a message to the call handling computing device 110 to notify the call handler that "EYES ARE ON INCIDENT LOCATION." At step 426, the crime center computing device 130 sends a message to the CAD computing device 120 to notify a dispatcher at the CAD computing device 120 that "EYES ARE ON INCIDENT LOCATION." At step 428, the crime center computing device 130 sends messages to the CAD computing device 120 with updates for the dispatcher. The updates may include video intelligence derived from the video feeds of the incident location. For example, the crime center computing device 130 may send messages to the CAD computing device 120 indicating that the protestors are fleeing the incident scene. In some embodiments, the crime center computing device 130 continues to send messages to the call handling computing device 110 with updates for the call handler. For example, the crime center computing device 130 may continue to send messages to the call handling computing device 110 when the call handler continues to communicate with the remote caller even though the dispatcher at the CAD computing device 120 is also actively working the incident. At step 430, the crime center computing device 130 sends the video feeds of the incident location to the CAD computing device 120 for sharing with the dispatcher. In some embodiments, prior to sharing the video feeds of the incident location with the dispatcher, the crime center computing device 130 determines if the dispatcher is authorized to receive the video feeds of the incident location. For example, in some embodiments, the CAD computing device 120 sends an identifier of the dispatcher to the crime center computing device 130 and the crime center computing device 130 uses the identifier to determine if the dispatcher is authorized to receive the video feeds of the incident location. In some embodiments, the crime center computing device 130 continues to send the video feeds of the caller location to the call handling computing device 110 for sharing with call handler. For example, the crime center computing device 130 may continue to send the video feeds to the call handling computing device 110 when the call handler continues to communicate with the remote caller even though the dispatcher at the CAD computing device 120 is also actively working the incident.

In some embodiments, when the remote caller is substantially at the location of the incident, the crime center computing device 130 shares the same video intelligence and/or video feeds with both the call handler and the dispatcher. For example, when the GPS coordinates of the remote caller and the incident match (or match within a predetermined range), the call handling computing device 110 and the CAD computing device 120 receive, from the crime center computing device 130, the video intelligence and/or the video feeds from the one or more available cameras substantially at the location of the remote caller. Further, the call handling computing device 110 and the CAD computing device 120 receive, from the crime center computing device 130, the video intelligence and/or the video feeds from the one or more available cameras substantially at the location of the incident.

At step 432 in FIG. 4C, the call handling computing device 110 sends a message to the crime center computing device 130 to remove focus on the caller location (for example, when the call has ended). At step 434, the crime center computing device 130 instructs the intelligence analyst at the crime center computing device 130 to remove their focus on the caller location in the video feeds of the caller location. At step 436, the crime center computing device 130 sends a message to the call handling computing device 110 to notify the call handler that the focus on the caller location has been removed. At step 438, the CAD computing device 120 sends a message to the crime center computing device 130 to remove focus on the incident location (for example, when the incident is closed). At step 440, the crime center computing device 130 instructs the intelligence analyst at the crime center computing device 130 to remove their focus on the incident location in the video feeds of the incident location. At step 442, the crime center computing device 130 sends a message to the CAD computing device 120 to notify the dispatcher that the focus on the incident location has been removed.

In some embodiments, the communication device 112 of the remote caller sends a video feed (e.g., captured by a camera 135 included in the communication device 112) to the call handling computing device 110 for sharing with the call handler (e.g., during the call). In some embodiments, the call handling computing device 110 sends the video feed received from the communication device 112 to the crime center computing device 130 for sharing with the analyst. Alternatively or in addition, the call handling computing device 110 sends the video feed received from the communication device 112 to the CAD computing device 120 for sharing with the dispatcher. In some embodiments, the communication device 112 of the remote caller sends a video feed (e.g., captured by a camera 135 included in the communication device 112) to the CAD computing device 120 for sharing with the dispatcher. In some embodiments, the CAD computing device 120 sends the video feed received from the communication device 112 to the crime center computing device 130 for sharing with the analyst. Alternatively or in addition, the CAD computing device 120 sends the video feed received from the communication device 112 to the call handling computing device 110 for sharing with the call handler. In some embodiments, the communication device 112 of the remote caller sends a video feed (e.g., captured by a camera 135 included in the communication device 112) to the crime center computing device 130 for sharing with the analyst. In some embodiments, the crime center computing device 130 sends the video feed received from the communication device 112 to the call handling computing device 110 for sharing with the call handler. Alternatively or in addition, the crime center computing device 130 sends the video feed received from the communication device 112 to the CAD computing device 120 for sharing with the dispatcher.

In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment may be implemented as a computer-readable storage medium having computer readable code stored thereon for programming a computer (for example, comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A system for sharing on-scene camera intelligence, available at crime center computing devices, with public or enterprise safety call handling computing devices, the system comprising
  a public or enterprise safety call handling computing device including
    an output interface; and
    a call handling electronic processor configured to
      receive a call from a remote caller and caller location information identifying a location of the remote caller,
      transmit, via an intervening interne protocol (IP) network to a crime center computing device, a camera availability request including the caller location information,
      receive, via the intervening IP network from the crime center computing device, an indication of one or more available cameras substantially at the location of the remote caller and status information for the one or more available cameras,
      provide, by the output interface, a call handling user at the public or enterprise safety call handling computing device with the status information for the one or more available cameras, and
      receive, via the intervening IP network from the crime center computing device, at least one of video intelligence derived from the one or more available cameras or video feeds from the one or more available cameras,
    wherein the call handling electronic processor configured to receive, via the intervening IP network from the crime center computing device, the at least one of the video intelligence derived from the one or more available cameras or the video feeds from the one or more available cameras comprises the call handling electronic processor configured to receive the video intelligence derived from the one or more available cameras,
    wherein the status information for the one or more available cameras includes an eyes on caller location notification indicating that a crime center user at the crime center computing device is watching the video feeds from the one or more available cameras, and
    wherein the video intelligence derived from the one or more available cameras including at least one of audio data or text messages describing what the crime center user sees via the video feeds of the one or more available cameras.

2. The system of claim 1, wherein the call handling electronic processor is further configured to
  transmit, via the intervening IP network to the crime center computing device, a request to remove focus from the location of the remote caller, and
  receive, via the intervening IP network from the crime center computing device, a focus on caller location removal notification indicating that the crime center user at the crime center computing device is no longer watching the video feeds from the one or more available cameras.

3. The system of claim 1, wherein the call handling electronic processor is further configured to transmit, via the intervening IP network to the crime center computing device, a description of the remote caller,
  wherein the call handling electronic processor configured to receive, via the intervening IP network from the crime center computing device, the at least one of the video intelligence derived from the one or more available cameras or the video feeds from the one or more available cameras comprises the call handling electronic processor configured to receive the video feeds from the one or more available cameras, and
  wherein the remote caller is highlighted in the video feeds.

4. The system of claim 1, further comprising
  a public or enterprise safety computer aided dispatch (CAD) computing device including a CAD electronic processor configured to transmit, via the intervening IP network to the crime center computing device, incident information of an incident associated with the call, wherein the incident information including incident location information.

5. The system of claim 4, wherein the CAD electronic processor is further configured to
  responsive to the incident location information substantially matching the caller location information, receive, via the intervening IP network from the crime center computing device, the at least one of the video intelligence derived from the one or more available cameras or the video feeds from the one or more available cameras.

6. The system of claim 1, wherein the call handling electronic processor is further configured to receive, via the intervening IP network from the crime center computing device, a notification identifying another call handling user that recently requested at least one of the one or more available cameras or another nearby camera.

7. The system of claim 1, wherein the call handling electronic processor is further configured to transmit, via the intervening IP network to the crime center computing device, a call status update.

8. A system for sharing on-scene camera intelligence, available at crime center computing devices, with public or enterprise safety call handling computing devices, the system comprising
a public or enterprise safety call handling computing device including
an output interface; and
a call handling electronic processor configured to
receive a call from a remote caller and caller location information identifying a location of the remote caller, transmit, via an intervening interne protocol (IP) network to a crime center computing device, a camera availability request including the caller location information,
receive, via the intervening IP network from the crime center computing device, an indication of one or more available cameras substantially at the location of the remote caller and status information for the one or more available cameras,
provide, by the output interface, a call handling user at the public or enterprise safety call handling computing device with the status information for the one or more available cameras, and
receive, via the intervening IP network from the crime center computing device, at least one of video intelligence derived from the one or more available cameras or video feeds from the one or more available cameras,
wherein the public or enterprise safety call handling computing device further includes an input interface, and wherein the call handling electronic processor is further configured to
provide an ability to request, via the input interface, that the one or more available cameras be allocated to aid the call handling user in handling the call,
receive, via the input interface, a request to allocate the one or more available cameras to aid the call handling user in handling the call, and
transmit, via the intervening IP network to the crime center computing device, the request to allocate the one or more available cameras to aid the call handling user in handling the call.

9. The system of claim 8, wherein the request to allocate the one or more available cameras to aid the call handling user in handling the call includes an identifier of the call handling user.

10. A method for sharing on-scene camera intelligence, available at crime center computing devices, with public or enterprise safety call handling computing devices, the method comprising:
receiving, at a public or enterprise safety call handling computing device, a call from a remote caller and caller location information identifying a location of the remote caller;
transmitting, by the public or enterprise safety call handling computing device via an intervening internet protocol (IP) network to a crime center computing device, a camera availability request including the caller location information;
receiving, by the public or enterprise safety call handling computing device via the intervening IP network from the crime center computing device, an indication of one or more available cameras substantially at the location of the remote caller and status information for the one or more available cameras;
providing, by an output interface of the public or enterprise safety call handling computing device, a call handling user at the public or enterprise safety call handling computing device with the status information for the one or more available cameras; and
receiving, by the public or enterprise safety call handling computing device via the intervening IP network from the crime center computing device, at least one of video intelligence derived from the one or more available cameras or video feeds from the one or more available cameras,
wherein receiving, by the public or enterprise safety call handling computing device via the intervening IP network from the crime center computing device, the at least one of the video intelligence derived from the one or more available cameras or the video feeds from the one or more available cameras comprises receiving the video intelligence derived from the one or more available cameras,
wherein the status information for the one or more available cameras includes an eyes on caller location notification indicating that a crime center user at the crime center computing device is watching the video feeds from the one or more available cameras, and
wherein the video intelligence derived from the one or more available cameras including at least one of audio data or text messages describing what the crime center user sees via the video feeds of the one or more available cameras.

11. The method of claim 10, further comprising
transmitting, from the public or enterprise safety call handling computing device via the intervening IP network to the crime center computing device, a request to remove focus from the location of the remote caller; and
receiving, at the public or enterprise safety call handling computing device via the intervening IP network from the crime center computing device, a focus on caller location removal notification indicating that the crime center user is no longer watching the video feeds from the one or more available cameras.

12. The method of claim 10, further comprising transmitting, by the public or enterprise safety call handling computing device via the intervening IP network to the crime center computing device, a description of the remote caller,
wherein receiving, by the public or enterprise safety call handling computing device via the intervening IP network from the crime center computing device, the at least one of the video intelligence derived from the one or more available cameras or the video feeds from the one or more available cameras comprises receiving the video feeds from the one or more available cameras, and
wherein the remote caller is highlighted in the video feeds.

13. The method of claim 10, further comprising transmitting, by a public or enterprise safety computer aided dispatch (CAD) computing device via the intervening IP network to the crime center computing device, incident information of an incident associated with the call, wherein the incident information including incident location information.

14. The method of claim 10, further comprising
responsive to the incident location information substantially matching the caller location information, receiving, by the public or enterprise safety CAD computing device via the intervening IP network from the crime center computing device, the at least one of the video intelligence derived from the one or more available cameras or the video feeds from the one or more available cameras.

15. The method of claim 10, further comprising receiving, by the public or enterprise safety call handling computing device via the intervening IP network from the crime center computing device, a notification identifying another call handling user that recently requested at least one of the one or more available cameras or another nearby camera.

16. The method of claim 10, further comprising transmitting, by the public or enterprise safety call handling computing device via the intervening IP network to the crime center computing device, a call status update.

17. The method of claim 10, further comprising
providing an ability to request, via an input interface of the public or enterprise safety call handling computing device, that the one or more available cameras be allocated to aid the call handling user in handling the call;
receiving, via the input interface, a request to allocate the one or more available cameras to aid the call handling user in handling the call; and
transmitting, by the public or enterprise safety call handling computing device via the intervening IP network to the crime center computing device, the request to allocate the one or more available cameras to aid the call handling user in handling the call.

18. The method of claim 17, wherein the request to allocate the one or more available cameras to aid the call handling user in handling the call includes an identifier of the call handling user.

* * * * *